United States Patent [19]

Spöning

[11] 4,219,595
[45] Aug. 26, 1980

[54] PRINTING BLANKET AND METHOD OF MAKING SAME

[75] Inventor: Günter Spöning, Northeim, Fed. Rep. of Germany

[73] Assignee: Continental Gummi-Werke Aktiengesellschaft, Hanover, Fed. Rep. of Germany

[21] Appl. No.: 910,015

[22] Filed: May 26, 1978

[30] Foreign Application Priority Data

May 27, 1977 [DE] Fed. Rep. of Germany ....... 2723993

[51] Int. Cl.² .............................................. B32B 1/00
[52] U.S. Cl. ..................................... 428/40; 101/215; 101/217; 156/162; 156/247; 156/495; 156/555; 428/354; 428/906; 428/909
[58] Field of Search .................... 428/40, 41, 42, 909, 428/906, 354; 101/215, 217; 156/160, 162, 163, 164, 191, 192, 229, 247, 495, 555

[56] References Cited

U.S. PATENT DOCUMENTS

| | | | |
|---|---|---|---|
| 3,547,768 | 12/1970 | Layne | 156/229 |
| 3,802,952 | 4/1974 | Gurin et al. | 428/909 |
| 3,903,794 | 9/1975 | Grupe et al. | 428/311 |
| 4,092,925 | 6/1978 | Fromson | 101/467 |

*Primary Examiner*—William J. Van Balen
*Attorney, Agent, or Firm*—Becker & Becker

[57] ABSTRACT

An adhesive printing blanket including rubber or rubber-like material. The printing blanket may also be provided with reinforcing inserts. A foil-like protective layer covers the adhesive layer of the printing blanket. The protective layer, which is elastically flexible, is removed by pulling off prior to the adhesive mounting of the printing blanket. The protective layer is under a tensile stress to preclude creasing during rolling up of the printing blanket into a roll and during subsequent spreading out of the printing blanket into a plane.

4 Claims, 2 Drawing Figures

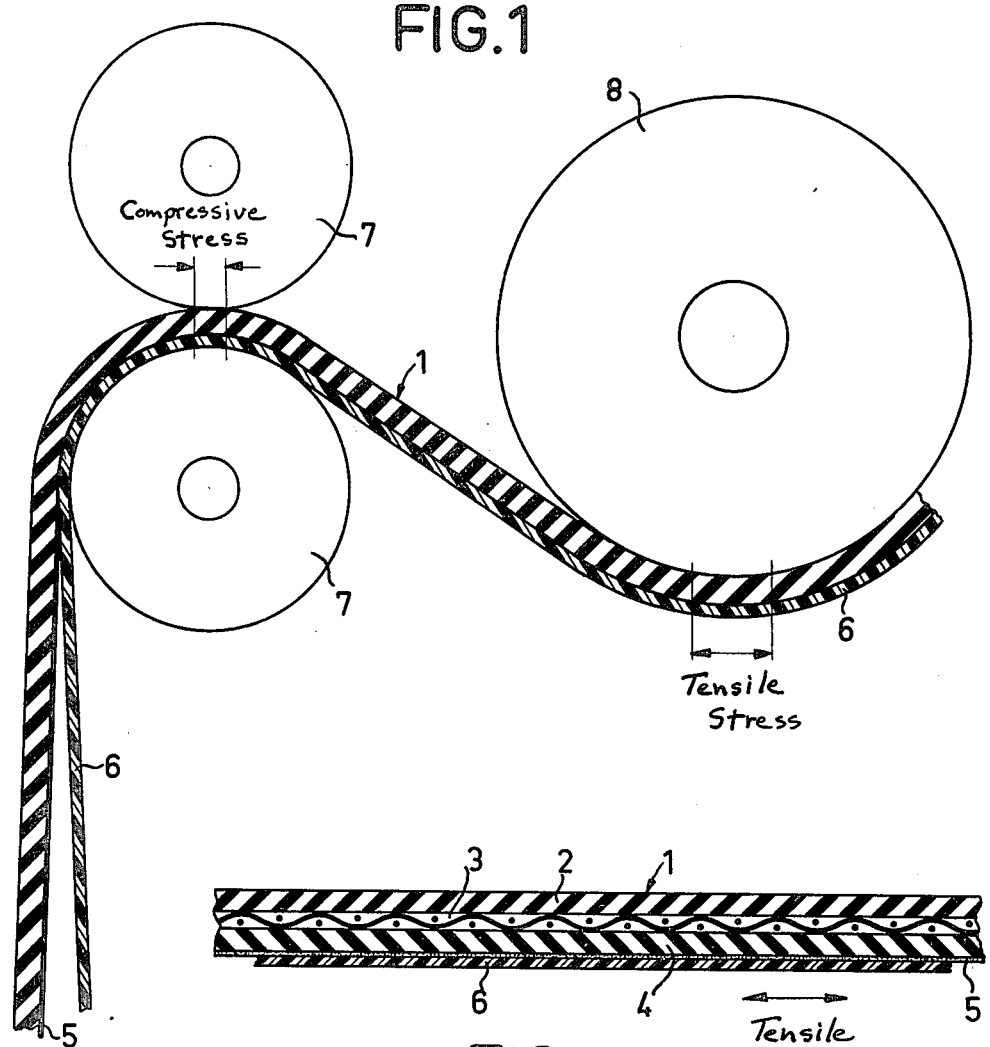

PRINTING BLANKET AND METHOD OF MAKING SAME

The present invention relates to an adhesive printing blanket and a method of making same, which blanket comprises rubber or rubber-like material. The printing blanket may also be provided with reinforcing inserts. A foil-like protective layer covers the adhesive layer of the printing blanket. The protective layer is removed by pulling off prior to the adhesive mounting of the printing blanket.

This printing blanket, which is mounted by being adhesively fastened to rubber cylinders or to the pertaining cylinder, is normally used when the entire bulk of the cylinder is to be utilized, for example during the printing of forms. It is further known to cut the printing blankets to size in such a way that they correspond exactly to the desired shape. On the other hand, with printing blankets of the above described general type, difficulties are encountered if the printing blankets are shipped in a roll, are stored, and are then to be cut to size on location. These difficulties arise as a result of the different physical properties of the printing blanket itself on the one hand, and the protective layer on the other hand. For this reason, when rolling up the known printing blankets, crease formation is unavoidable, especially in the protective layer.

It is therefore essentially an object of the present invention to improve printing blankets of the above mentioned general type in such a way that the protective layer does not wrinkle during storage and transportation of the printing blanket in a roll, and when cutting the printing blanket to size in a plane.

This object and other objects and advantages of the present invention will appear more clearly from the following specification in connection with the accompanying drawing, in which:

FIG. 1 is a side view of a device for applying a protective layer to a printing blanket together with a device for winding up the printing blanket provided with a protective layer; and FIG. 2 shows a section of a printing blanket removed from the roll and laid in a plane.

The printing blanket of the present invention is characterized primarily in that the protective layer is elastically flexible and is under a tensile stress to preclude creasing during rolling up of the printing blanket into a roll. This tensile stress, which is directed tangential to the roll and is induced in the protective layer through elastic flexibility, prevents the formation of creases, which can only occur if the tensile stresses in the protective layer are removed. Accordingly, the elastic prestressing of the protective layer is made great enough that a tensile stress is still present even when the printing blanket lies in a plane, such as is the case when, generally at the site, the printing blanket is to be cut to the desired size.

The protective layer is expediently a foil or laminate of plastic or other synthetic material having a thickness of about 0.1 to 0.3 mm. The protective foil is adhesively attached to the printing blanket in such a way that it is easily pulled off.

To generate a tensile stress with the manufacture of printing blankets of greater length or size, the protective layer is preferably elastically flexed and, under the thus resulting inherent stress, is joined with the printing blanket proper by being pressed there-against. The elastic inherent stress within the protective layer can also, by rolling up the printing blanket and the protective layer together on the core, be generated in such a way that the protective layer faces the mantle of the core. With the subsequent rolling up of the printing blanket into a roll, the web formed from the printing blanket is shaped together with the protective layer in such a way that this layer now lies on the outside.

Referring now to the drawing in detail, the printing blanket 1, which in itself may be of any desired construction, is shown with a rubber or similar cover 2. Beneath the cover 2 is a reinforcing insert 3 which is in the form of a web. Below the reinforcing insert 3 is located a lower layer 4 which is likewise made of rubber or rubber-like material and has a good deformability. The outer surface of the lower layer 4 is provided with an adhesive layer 5, by means of which the printing blanket 1 is adhesively mounted to a cylinder (not shown). This adhesive layer 5 is covered by a foil or laminate 6 of plastic or other synthetic material which is about 0.2 mm thick. The foil 6 is elastically flexible, is adhesively attached to the adhesive layer 5, and is pulled off in the customary manner shortly before the adhesive mounting of the printing blanket 1.

The printing blanket 1 is manufactured in the customary manner, and then, by means of doubling rollers 7, is joined or connected with the plastic foil 6 which is separately supplied. In this connection, compressive stresses appear in the region facing the lower doubling roller as a result of being guided around this roller. When the printing blanket 1 and the plastic foil 6 are joined, both parts have their directions reversed and, with the use of a core 8, are formed into a roll in such a way that tensile stresses result in the plastic layer 6. These tensile stresses are directed tangential to the roll and allow formation of a particularly smooth plastic foil 6. In the region of the elastic flexing of the synthetic or plastic material, these tensile stresses are so great that the plastic foil 6 does not get creased even if the printing blanket 1 is placed in a plane, as shown in FIG. 2, in order to be able to convert the printing blanket into the desired shape.

When practicing the method of the present invention, care must be taken that the printing blanket 1 proper is not affected in an undesired manner as a result of the stresses introduced into the plastic foil 6. Thus, the printing blanket 1 must remain completely smooth and even, even when an initial stress is introduced into the plastic foil 6. The tensile stress in the plastic foil 6 must therefore preclude a crease formation in the printing blanket 1. Examples of plastic or synthetic material which can be used for the foil 6 include PVC and polyethylenes. Polypropylenes and polyamides could also be used.

The present invention is, of course, in no way limited to the specific showing in the drawing, but also encompasses any modifications within the scope of the appended claims.

What I claim is:

1. In combination: an adhesive printing blanket made for application subsequently on a printing cylinder and comprising a first section having a longitudinal direction and an adhesive layer on said first section; and a foil-like elastically flexible protective layer removably connected to that side of said adhesive layer which is remote from said first section, said protective layer being under tensile stress in the longitudinal direction and being provided for transporting as well as storage thereof after production subject to removal of said protective layer prior to application of said first section of the adhesive printing blanket upon the printing cylinder, said protective layer having absolutely no direct influence upon the printing blanket during subsequent printing operation itself though protecting the printing blanket in undamaged and undeformed condition for actual use thereof.

2. A combination according to claim 1, in which said first section is made of elastomeric material.

3. A combination according to claim 1, in which said first section comprises a first elastomeric layer, a second elastomeric layer, and a reinforcing insert interposed between and connected to said first and second layer, said adhesive layer being connected to one of said elastomeric layers.

4. A method of making an adhesive printing blanket made for application subsequently on a printing cylinder and comprising a first section having a longitudinal direction and an adhesive layer on said first section; and a foil-like elastically flexible protective layer removable connected to that side of said adhesive layer which is remote from said first section, said protective layer being under tensile stress in the longitudinal direction and being provided for transporting as well as storage thereof after production subject to removal of said protective layer prior to application of said first section of the adhesive printing blanket upon the printing cylinder, said protective layer having absolutely no direct influence upon the printing blanket during subsequent printing operation itself though protecting the printing blanket in undamaged and undeformed condition for actual use thereof, which includes the step of generating elastic tension in said protective layer by rolling said protective layer together with said printing blanket on a cylindrical mantle in such a way that said protective layer first faces said mantle and then, by rolling up said printing blanket, faces outwardly.

* * * * *

UNITED STATES PATENT AND TRADEMARK OFFICE
CERTIFICATE OF CORRECTION

PATENT NO. : 4219595

DATED : 26 August 1980

INVENTOR(S) : GÜNTER SPÖRING

It is certified that error appears in the above—identified patent and that said Letters Patent is hereby corrected as shown below:

[75]   Günter Spöring, Northeim, Fed. Rep. of Germany

*Signed and Sealed this*

*Twenty-eighth* Day of *October 1980*

[SEAL]

*Attest:*

SIDNEY A. DIAMOND

*Attesting Officer*    *Commissioner of Patents and Trademarks*